3,194,745
URANIUM MONOSULFIDE-MONOCARBIDE NUCLEAR FUEL ELEMENT

Joseph H. Handwerk and George D. White, Joliet, and Peter D. Shalek, Champaign, Ill., assignors to the United States of America as represented by the United States Atomic Energy Commission
No Drawing. Filed Feb. 6, 1964, Ser. No. 343,165
8 Claims. (Cl. 176—67)

This invention deals with fuel material for nuclear reactors and in particular with uranium-carbide-containing so-called ceramic-type fuel core material that is to be used primarily for liquid-metal-cooled nuclear reactors.

Uranium carbide fuel clad with stainless steel has been used heretofore for the above-described nuclear reactors. However, these fuel elements created problems, because the uranium monocarbide could not be prepared readily in exactly stoichiometric composition.

When the carbon in uranium monocarbide was present in an excessive quantity, iron carbide was formed from the excess carbon and the stainless steel of the cladding under the influence of the sodium coolant. On the other hand, in the case of a carbon deficiency, the excess uranium at the interface between the core and the cladding formed an alloy with the iron and mostly the uranium-iron eutectic. In both instances, the protective characteristic of the cladding, the corrosion resistance of the fuel core and the thermal conductivity of the fuel element were impaired.

Another disadvantage of uranium carbide fuel is that it reacts readily with the moisture of air and therefore cannot be stored after fabrication without precaution, but has to be used promptly in the reactor. The thermal conductivity of stainless-steel-clad uranium monocarbide fuel elements decreases with increasing temperature, which is another disadvantage and particularly undesirable in the case of most fast reactors.

Uranium sulfide has also been tried as fuel material for reactors; however, there exists a certain reluctance in the art towards the use of such sulfide fuel, because it does not have the neutron-moderating characteristic that the carbide has, and also because it has a lower density than uranium carbide.

It is an object of this invention to provide stainless-steel-clad uranium carbide nuclear fuel elements whose physical characteristics are not rigidly dependent on precisely stoichiometric monocarbide composition.

It is another object of this invention to provide stainless-steel-clad uranium carbide nuclear fuel elements that are corrosion-resistant to reactor coolants even at elevated temperatures.

It is also an object of this invention to provide stainless-steel-clad uranium carbide nuclear fuel elements that have satisfactory thermal conductivity even at high temperatures and that can be used at temperatures as high as the cladding material permits.

It is finally an object of this invention to provide a core material for nuclear fuel elements that does not react considerably with the moisture of the atmosphere and therefore can be stored prior to use in a reactor.

It was found that, when uranium sulfide has been incorporated in uranium carbide, no reaction takes place between a stainless steel cladding and the core even if the monocarbide is not of precisely stoichiometric composition. Corroding factors, such as a sodium coolant, also do not impair the protective feature of the cladding.

Any mixture of uranium sulfide and uranium monocarbide can be used as the fuel; the beneficial effect of the sulfide and the characteristics of the fuel will vary with its quantity present. A uranium sulfide content within the range of from 4 to 20% of the mixture was preferred.

The uranium sulfide can be prepared by any method known to those skilled in the art, for instance by the reaction of uranium hydride or uranium powder with hydrogen sulfide at about 450° C. The sulfide is preferably sintered in vacuum at about 1900° C. for approximately two hours, and the sintered material is ground to a particle size of less than 15 microns.

The uranium carbide, too, may be prepared by conventional methods. For the tests that led to this invention, the uranium carbide was prepared by arc-melting a mixture of uranium and carbon powders and by ball-milling the obtained product to a particle size of below 15 microns.

The carbide and sulfide powders are then mixed. A small quantity of an organic binder volatile at sintering temperature is added to the ground reaction product; organic materials such as stearic acid, carbowax and other similar compounds known to those skilled in the art are suitable binders. A quantity of about 1% of the binder is sufficient. The mixture is formed into pellets and sintered at about 1600° C. for from 2 to 4 hours. The fuel cores thus obtained are clad either with a stainless steel, such as stainless steel 304, which contains 18 to 20% of chromium, 8 to 11% of nickel, a maximum of 2% of manganese and a maximum of 0.08% of carbon, or with niobium or molybdenum metal.

It was determined that uranium sulfide is soluble in uranium carbide in a quantity of about 7% by weight and that uranium carbide is soluble in uranium sulfide to about 40%. Such high solubilities were not to be expected, because the two compounds have considerably different lattice dimensions.

In order to examine the compatibility of the fuel material prepared by the process of this invention with various cladding metals, a mixture of 80% by volume of powdered fuel with 20% by volume of powdered cladding metal was prepared. 1% of an organic volatile binder was added to this mixture, and specimens were pressed from the mixture and heated in vacuum at 1150° C. for eight days. The sintered specimens were then polished and examined metallographically. The results are listed in the table below.

| Cladding Metal | UC | 10 w/o US in UC |
|---|---|---|
| Stainless Steel 304 | Complete reaction or migration of metal; densification of specimen much greater than others. | Metal particles still intact, although some reaction as evidenced by carbide crystals grown in metal. |
| Niobium | Complete reaction of smaller metal particles, larger particles contained metal cores. | Very slight reaction at surface of metal particles. |
| Tantalum | Complete reaction of particles with carbide matrix; apparently two carbide phases in particles. | Shallow reaction zone with core. |
| Molybdenum | Complete carburization of metal particles. | Very slight reaction, if any. |
| Vanadium | Complete carburization. | Partial reaction; some metal left. |

It will be seen from the table that two series of experiments were carried out in each instance, one with a core material containing uranium carbide only and one with a core material that contained 10% by weight of uranium sulfide in the uranium monocarbide mixture. It will be recognized that with the uranium carbide alone, a complete reaction with the cladding material took place in all five instances, while comparatively little reaction occurred with the sulfide-containing specimens. It will also be noted that stainless steel, niobium and molybdenum are better cladding metals than tantalum and vanadium.

It will be understood that the invention is not to be limited to the details given herein but that it may be modified within the scope of the appended claims.

What is claimed is:

1. As a new composition of matter, a fuel for nuclear reactors consisting of a mixture of uranium monosulfide and uranium monocarbide.

2. The fuel of claim 1, wherein the uranium sulfide content of the mixture is between 4 and 20 percent by weight.

3. A fuel element for nuclear reactors comprising a core of a uranium monosulfide-uranium monocarbide mixture and a metal cladding therearound.

4. The fuel element of claim 3, wherein the mixture of the core contains from 4 to 20 percent by weight of uranium monosulfide.

5. The fuel element of claim 4, wherein the cladding consists of niobium metal.

6. The fuel element of claim 4, wherein the cladding consists of niobium metal.

7. The fuel element of claim 4, wherein the cladding consists of molybdenum metal.

8. The composition of matter of claim 1 wherein the uranium monocarbide is of nonstoichiometric composition.

References Cited by the Examiner
UNITED STATES PATENTS 2,956,000 10/60 Kendall et al. _____ 176—91 X
3,091,581 4/63 Barr et al. _____ 179—69
3,145,182 8/64 Hammond et al. _____ 252—301.1

OTHER REFERENCES

Nuclear Science Abstracts, vol. 16, abstract number 33466, abstracted report published June 25, 1962, page 4431.

CARL D. QUARFORTH, *Primary Examiner.*

BENJAMIN R. PADGETT, *Examiner.*

UNITED STATES PATENT OFFICE
CERTIFICATE OF CORRECTION

Patent No. 3,194,745                                    July 13, 1965

Joseph H. Handwerk et al.

It is hereby certified that error appears in the above numbered patent requiring correction and that the said Letters Patent should read as corrected below.

Column 3, line 21, for "niobium metal" read -- stainless steel --.

Signed and sealed this 26th day of April 1966.

(SEAL)
Attest:

ERNEST W. SWIDER
Attesting Officer

EDWARD J. BRENNER
Commissioner of Patents